(12) United States Patent
Gao

(10) Patent No.: US 7,951,744 B2
(45) Date of Patent: May 31, 2011

(54) NANO-REAGENTS WITH COOPERATIVE CATALYSIS AND THEIR USES IN MULTIPLE PHASE REACTIONS

(75) Inventor: Yong Gao, Carbondale, IL (US)

(73) Assignee: Southern Illinois University Carbondale, Carbondale, IL (US)

( * ) Notice: Subject to any disclaimer, the term of this patent is extended or adjusted under 35 U.S.C. 154(b) by 1154 days.

(21) Appl. No.: 11/668,151

(22) Filed: Jan. 29, 2007

(65) Prior Publication Data

US 2007/0184970 A1    Aug. 9, 2007

Related U.S. Application Data

(60) Provisional application No. 60/763,123, filed on Jan. 27, 2006.

(51) Int. Cl.
  *A62D 3/38* (2007.01)
  *B01J 31/30* (2006.01)
(52) U.S. Cl. ......... 502/159; 502/170; 502/171; 502/150
(58) Field of Classification Search ........................ None
  See application file for complete search history.

(56) References Cited

U.S. PATENT DOCUMENTS

| | | | |
|---|---|---|---|
| 4,247,406 A * | 1/1981 | Widder et al. ................ | 424/484 |
| 7,045,481 B1 | 5/2006 | Parasher et al. | |
| 2006/0175230 A1 | 8/2006 | Zhou et al. | |
| 2006/0258875 A1 | 11/2006 | Reyes et al. | |

OTHER PUBLICATIONS

Garadimalla et al., Chem. Commun., 2005, 4432-4434.*
Guo et al., Enzyme and Microbial Technology 32 (2003) 776-782.*
Xu et al., JACS, 2004, 126, 9938-9939.*
Dyal et al., JACS, 2003, 125, 1684-1685.*
Ozturk, Master of Science Dissertation, Izmir Institute of Technology, Turkey, Nov. 2001.*
Takahashi et al., Proc. Natl. Acad. Sci. USA, vol. 84, 00 7403-7407, 1987.*
Zheng, Y., et al., "Magnetic Nanoparticles as an Orthogonal Support of Polymer Resins: Applications to Solid-Phase Suzuki Cross-Coupling Reactions", Journal of Organic Chemistry, 2006, pp. 537-542, vol. 71.
Zheng, Y., et al., "A Magnetic Biomimetic Nanocatalyst for Cleaving Phosphoester and Carboxylic Ester Bonds under Mild Conditions", Organic Letters, 2006, pp. 3215-3217, vol. 8(15).
Pengo, P., et al., "Carbozylate—Imidazole Cooperativity in Dipeptide-Functionalized Gold Nanoparticles with Esterase-like Activity", Journal of American Chemistry, 2005, pp. 1616-1617, vol. 127.

* cited by examiner

*Primary Examiner* — Melvin C Mayes
*Assistant Examiner* — Yun Qian
(74) *Attorney, Agent, or Firm* — Polsinelli Shughart PC

(57) ABSTRACT

Nano-reagents with catalytic activity are provided herein. The nanocatalyst comprises at least one amino acid attached to a nanoparticle, wherein the reactive side chain of the amino acid catalyzes a chemical or biological reaction. Methods of using these nano-reagents to catalyze reactions in solution or in multiple phases are also provided, as are methods of making these nanocatalysts.

9 Claims, 11 Drawing Sheets

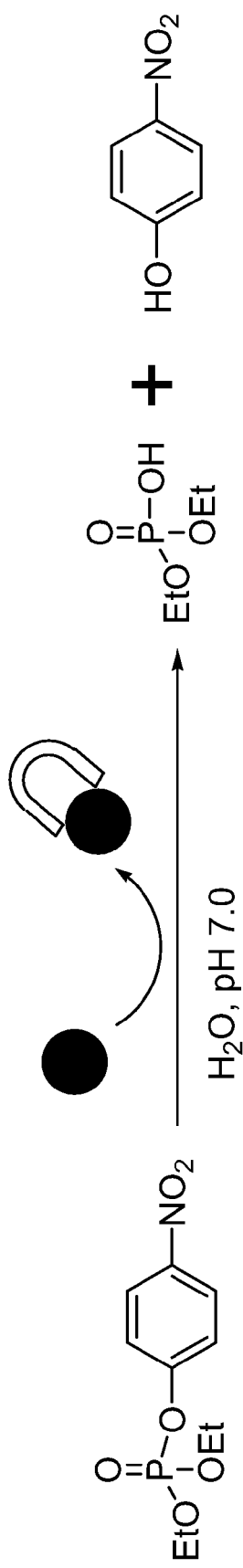
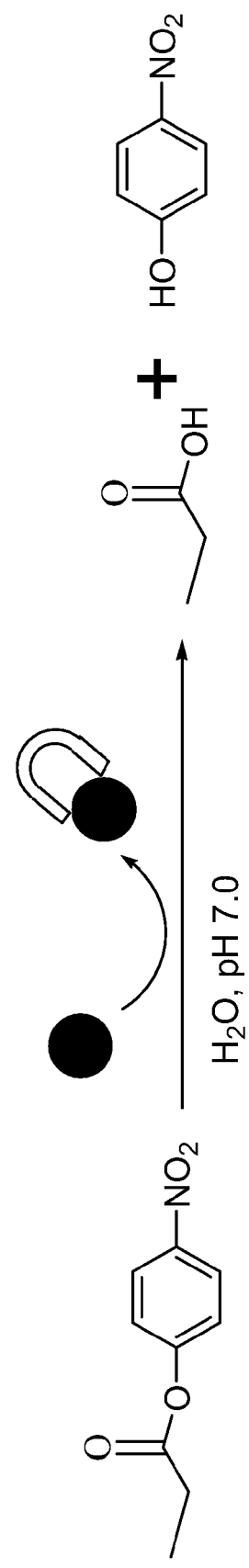
FIG. 3A
FIG. 3B

US 7,951,744 B2

NANO-REAGENTS WITH COOPERATIVE CATALYSIS AND THEIR USES IN MULTIPLE PHASE REACTIONS

CROSS-REFERENCE TO RELATED APPLICATION

This application claims priority to U.S. Provisional Application Ser. No. 60/763,123 filed on Jan. 27, 2006, which is hereby incorporated by reference in its entirety.

GOVERNMENTAL RIGHTS

This invention was made with Government support under grant numbers CHE-0343440 and CHE-0534321 awarded by the National Science Foundation CAREER Award Program. The Government has certain rights in this invention.

FIELD OF THE INVENTION

The present invention provides nano-reagents with catalytic activity and methods of using these nanocatalysts to catalyze chemical and biological reactions.

BACKGROUND OF THE INVENTION

Catalysts are widely used in many industrial applications, such as pharmaceutical and fine chemicals manufacturing. A catalyst may be necessary for a reaction to occur or for the process to be economically viable. Many catalysts are expensive because they are made from precious metals, such as platinum or palladium, or because of the processing required to make a catalyst of a particular size, shape, or crystal phase. Because of the scale of industrial process and the expense of the catalysts it is desirable to be able to recover and reuse catalysts. Tradition methods of recovery have met limited success, however.

Furthermore, enzymes catalyze some industrially important reactions. The limited stability, high substrate specificity, and limited availability of sufficient quantities of some enzymes, however, have tended to limit their use. Thus, a need exists for small, stable, biomimetic catalysts that also could be recovered and reused.

SUMMARY OF THE INVENTION

Among the various aspects of the present invention is the provision of a nanocatalyst comprising at least one amino acid attached to a nanoparticle, wherein the amino acid has a reactive side chain that catalyzes a chemical reaction.

Another aspect of the invention encompasses a method of using a nanocatalyst to catalyze a chemical reaction. The method comprises contacting a substrate with a nanocatalyst, wherein the nanocatalyst comprises at least one amino acid attached to a nanoparticle, wherein the amino acid has a reactive side chain that catalyzes the reaction to generate a product.

A further aspect of the invention provides a method of using a nanocatalyst to catalyze a multiple phase reaction. The method comprises contacting a substrate immobilized on a support matrix with a nanocatalyst comprising at least one reactive species attached to a nanoparticle. The reactive species catalyzes the reaction within the matrix to generate a product.

Yet a further aspect of the invention encompasses a method for making a nanocatalyst comprising at least one reactive species attached to a metal oxide nanoparticle. The process comprises mixing at least one hydroxyl-containing compound carrying the reactive species with a metal oxide nanoparticle coated with a hydrophobic surfactant. During the mixing step the hydroxyl-containing compound replaces the hydrophobic surfactant on the surface of the nanoparticle, whereby the nanocatalyst is produced.

DETAILED DESCRIPTION OF THE INVENTION

Figure 1A:
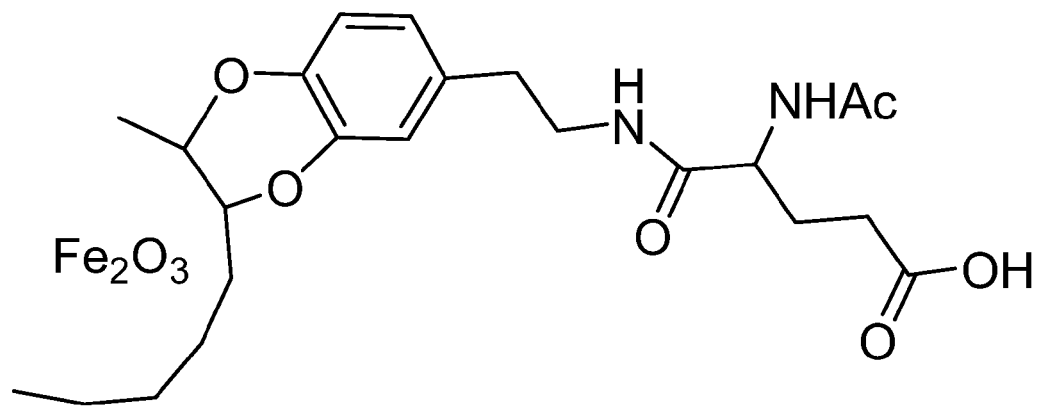
FIG. 1 presents schematic diagrams of nanocatalysts of the invention. A. A nanocatalyst comprising a carboxylic acid-containing amino acid (aspartic acid, Asp) attached via a dopamine linker to an iron oxide nanoparticle. B. A nanocatalyst comprising an imidazole-containing amino acid (histidine, His) attached via a dopamine linker to an iron oxide nanoparticle. C. A nanocatalyst comprising a thiol-containing amino acid (cysteine, Cys) attached via a dopamine linker to an iron oxide nanoparticle. D. A nanocatalyst comprising three different amino acids (Asp, His, Cys) attached via silicon hydroxide linkers to an iron oxide nanoparticle. E. A nanocatalyst comprising two amino acids (Asp, His) attached via dopamine linkers to an iron oxide nanoparticle. F. A nanocatalyst comprising a palladium-containing compound [N-heterocyclic carbene (Pd—NHC)] attached via a silicon hydroxide linker to an iron oxide nanoparticle. G. A nanocatalyst comprising a nanoparticle coated with a polymer, with amino acids attached to the polymer. H. A nanocatalyst comprising a nanoparticle coated with a polymer, with polypeptides attached to the polymer. I. A nanocatalyst comprising a nanoparticle coated with a polymer linked to reactive species. J. A nanocatalyst comprising a nanoparticle embedded in a matrix comprising polymer to which the reactive species are attached.

A nanocatalyst has been discovered that comprises at least one amino acid residue attached to a nanoparticle, wherein the reactive side chain of the amino acid catalyzes a chemical reaction. Furthermore, it has been discovered that these nano-reagents also catalyze biological reactions that are generally catalyzed by enzymes. The reactive groups of the amino acid side chains may interact cooperatively to catalyze the reaction, in a manner similar to the active sites of many enzymes. The reactions catalyzed by these nanocatalysts may be in solution or they may be in multiple phases. Additionally, nanocatalysts comprising a magnetic nanoparticle may be magnetically separated from the reaction products, byproducts, and excess reagents that are in solution or in one of the orthogonal matrices, such that the nanocatalysts may be recovered, recycled, and reused again.

I. Nanocatalyst (a) Nanoparticle

One aspect of the present invention provides a nanocatalyst comprising a nanoparticle attached to at least one reactive species, whereby the reactive species functions as a catalyst. In one embodiment the nanoparticle may be a magnetic material. Non-limiting examples of suitable magnetic materials include a metal, a metal oxide, a metal dioxide, a metallic salt, a metal alloy, an intermetallic alloy, an organic magnetic material, a derivative thereof, or a combination thereof. Suitable metals include iron, cobalt, manganese, nickel, or a rare earth metal. Alloys are typically combinations of two or more compounds, of which at least one is a metal. Suitable alloys, therefore, include alloys of iron, alloys of cobalt, alloys of manganese, and alloys of nickel. Intermetallic alloys are generally mixtures of two or more metals in a certain proportion. Suitable examples of an intermetallic alloy include cementite ($Fe_3C$), alnico (a blend of aluminum, nickel, and cobalt), or $Ni_3Al$ Among the suitable metal oxides include iron oxides, such as magnetite ($Fe_3O_4$) or maghemite ($Fe_2O_3$). Other suitable magnetic materials include ferrofluids or spinel ferrites. The magnetic material may also be an organic material, such as 7,7,8,8-tetracyano-p-quinodimethane or tetrathiafulvalenium tetracyanoqinomethane. In a preferred embodiment, the nanoparticle comprises an iron oxide.

In another embodiment, the nanoparticle may comprise a non-magnetic material. The non-magnetic material may be inorganic or organic. Suitable examples of an inorganic material include, but are not limited to, silver, gold, titanium, aluminum, cadmium, selenium, silicon, silica, or mixtures thereof. The inorganic material may be formulated into a nanocrystal, a nanosphere, a quantum dot, an electric semiconductor, and the like. An organic non-magnetic material may be a synthetic polymer, a semisynthetic polymer, or a natural polymer. Non-limiting examples of synthetic organic polymers include polyacrylate, polyacrylamide, poly(acrylamide sulphonic acid), polyacrylonitrile, polyamine, poly(amidoamine), poly(arylamine), polycarbonate, poly(ethylene glycol), poly(ester), poly(ethylene imine), poly(ethylene oxide), poly(ethyloxazoline), polyhydroxyethylacrylate, polymethacrylate, polymethacrylamide, poly(oxyalkylene oxide), poly(phenylene), poly(propylene imine), poly(propylene oxide), polystyrene, polyurethane, poly(vinyl alcohol), and poly(vinyl pyrrolidone). An example of a suitable natural polymer is cellulose and its (semisynthetic) derivatives, such as methylcellulose, carboxymethylcellulose, hydroxyethylcellulose, hydroxypropylcellulose, and hydroxy-propylmethylcellulose. Other examples of natural polymers include polysaccharides or carbohydrate polymers, such as hyaluronic acid, dextran, dextrin, heparan sulfate, chondroitin sulfate, heparin, alginate, agar, carrageenan, xanthan, and guar. The non-magnetic material may also be a micelle comprising an aggregate of surfactant molecules dispersed in a liquid.

One skilled in the art will appreciate that the size of a nanoparticle can and will vary depending on the nature of the material comprising the nanoparticle and the intended use of the nanocatalyst. The average diameter of a nanoparticle may range from about 0.01 nanometers (nm) to about 100,000 nm, preferably from about 0.1 nm to about 1,000 nm, and more preferably from about 1 nm to about 100 nm. In a preferred embodiment the average diameter of a nanoparticle may range from about 2 nm to about 25 nm.

(b) Reactive Species

The nanoparticle is linked to at least one reactive species, which functions as a catalyst. The reactive species may be an acidic functional group, a basic functional group, a nucleophilic functional group, or a catalyst atom.

In one embodiment, the reactive species may be an acidic functional group. In general, an acid functional group refers to a proton ($H^+$) donor. Examples of acidic groups include, but are not limited to, borate, carboxylate, hydroxamic acid, phenol, phosphoric acid, phosphorous acid, seleninic acid, sulfinate, sulfonate, thiol acid, or derivatives thereof.

In another embodiment, the reactive species may be a basic functional group. In general, a basic functional group refers to a proton ($H^+$) acceptor. Examples of basic groups include, but are not limited to, amino groups including primary, secondary and tertiary amines, heterocyclic amines, guanidines, or derivatives thereof.

In yet another embodiment, the reactive species may be a nucleophilic group. Generally, a nucleophilic group has an unshared pair of electrons, and the group may be neutral or have a negative charge. Examples of nucleophilic functional groups include, but are not limited to, amide, amino (including primary, secondary, or tertiary amines), borate, carboxylate, guanidine, heterocyclic amine, hydroxyl, hydroxylamine, hydroxamic acid, hydrazine, o-iodosylcarboxylate, phenol, phosphine, phosphine oxide, phosphine sulfide, phosphine sulfoxide, phosphorate, phosphorous acid, seleninic acid, sulfinate, sulfonate, thio, thiol acid, or derivatives thereof. In another aspect of this embodiment, the nucleophilic group may comprise —$X^1$—OH (or —$X^1$—$O^-$), —$X^1$—$NH_2$, or —$X^1$—SH (or —$X^1$—$S^-$) structures, where $X^1$ may be P, I, Br, Cl, B, Al, N, O, S, Se, As, Si, or Ge.

In an alternate embodiment, the reactive species may be a catalyst atom. In general, a catalyst atom is a metal or non-metal that exhibits catalytic activity. Non-limiting examples of a suitable catalyst atom include platinum, palladium, iridium, gold, osmium, ruthenium, rhodium, or rhenium. In a preferred embodiment, the catalyst atom forming the reactive species may be palladium.

Figure 1B:
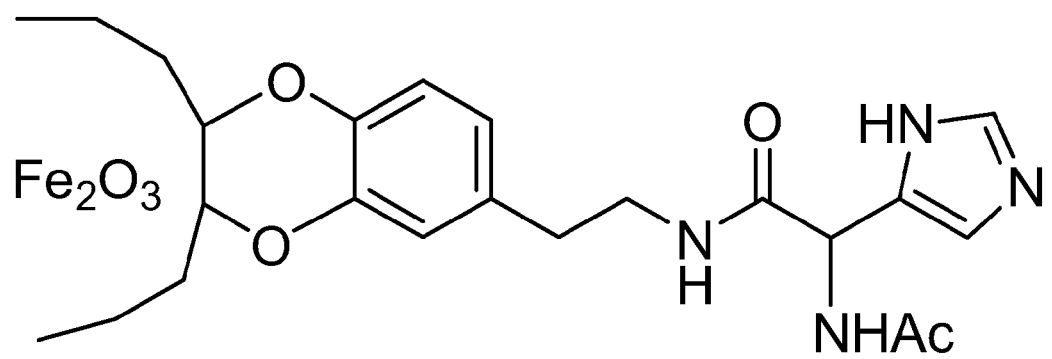
Figure 1C:
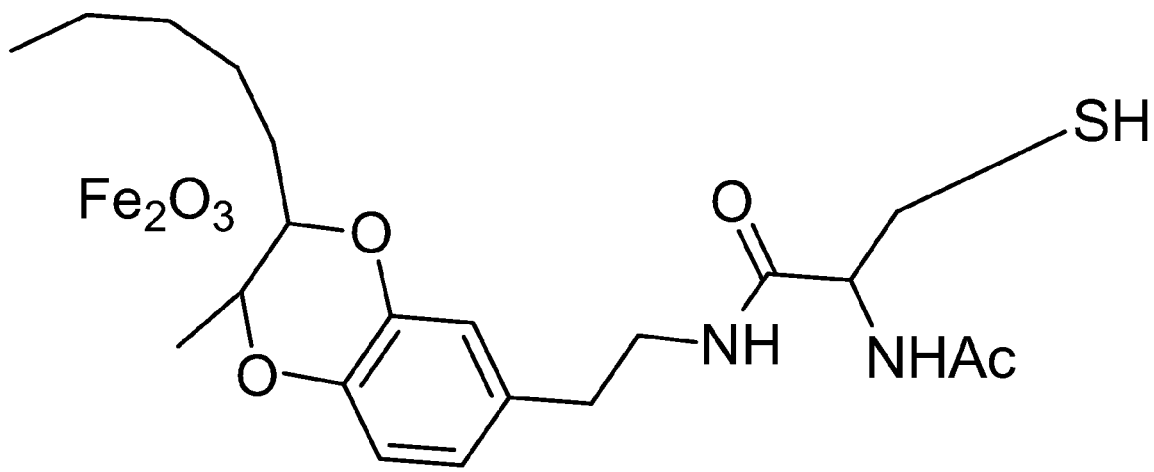
Figure 1D:
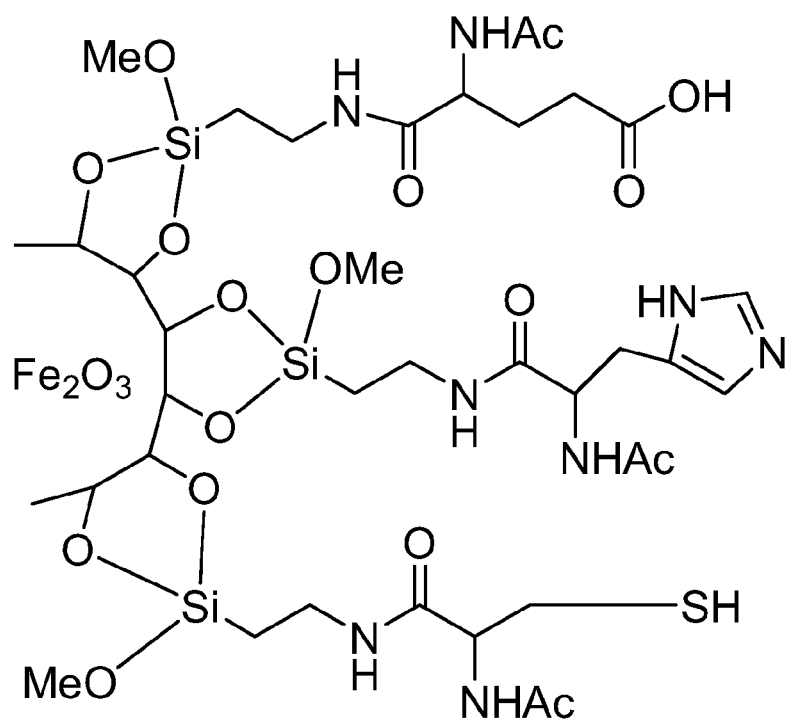
Figure 1E:
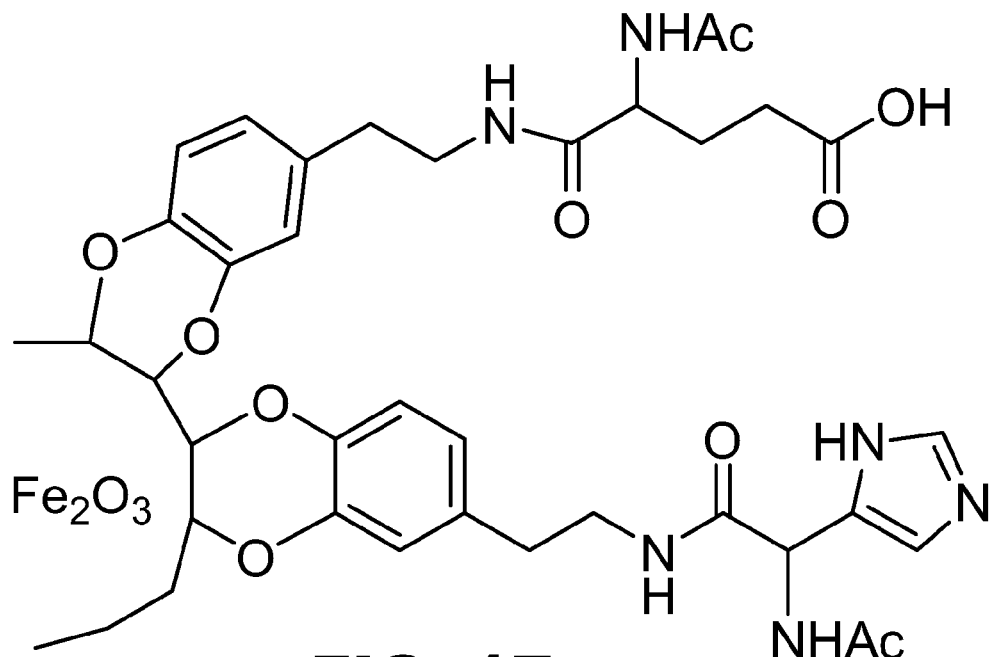
Figure 1F:
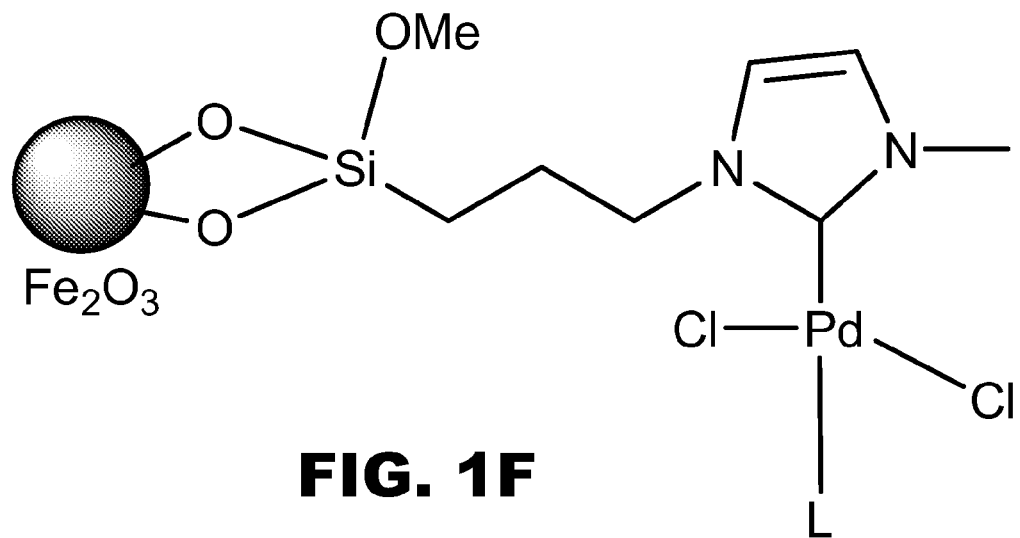
Figure 1G:
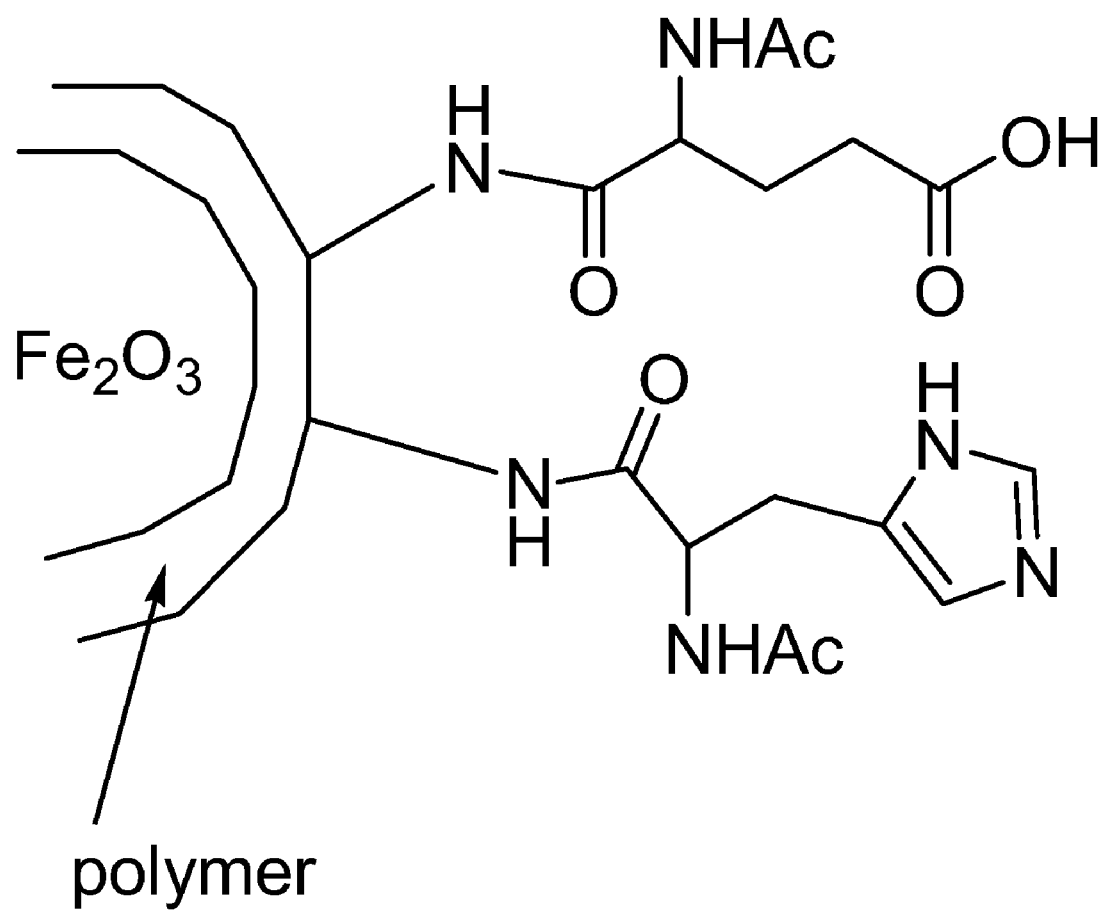

One skilled in the art will appreciate that the aforementioned reactive species may be part of a larger molecule. Essentially, the reactive species may be attached to a hydrocarbyl moiety or a substituted hydrocarbyl moiety. In one embodiment, the reactive species may be part of a larger chemical compound, e.g., palladium N-heterocyclic carbene (Pd—NHC) (see FIG. 1F). In another embodiment, the reactive species may be part of an amino acid or a polypeptide. In yet another embodiment, the reactive species may be part of a nucleic acid. In still another embodiment, the reactive species may be part of a carbohydrate. In a preferred embodiment, the reactive species comprises at least one amino acid. Amino acids with suitably reactive side chains include aspartic acid (Asp), cysteine (Cys), glutamic acid (Glu), histidine (His), lysine (Lys), and serine (Ser) (see FIG. 1A-C).

While at least one reactive species is attached to a nanoparticle, generally many reactive species will be attached to the nanoparticle. For example, a nanoparticle may be surrounded by a shell of reactive species. One skilled in the art will appreciate that the number of reactive species attached to a nanoparticle can and will vary depending upon the size of the nanoparticle and the density of reactive groups on the surface of the nanoparticle. The reactive species attached to the nanoparticle may be of the same type. For example, all of the reactive species attached to a nanoparticle may comprise acidic groups; they all may comprise carboxyl groups; they all may comprise palladium; and so forth. Alternatively, the reactive species attached to a nanoparticle may be of different types. For example, the reactive species attached to a nanoparticle may comprise a mixture of acidic groups and basic groups; they may comprise a mixture of acidic, basic, and neutrophilic groups; they may comprise a mixture of carboxyl groups and imidazole groups; they may comprise a mixture of different amino acids; and so forth.

In a preferred embodiment, a nanocatalyst may comprise a single type of amino acid. In an exemplary embodiment, a nanocatalyst may comprise two different types of amino acids, selected from the group consisting of Asp, Cys, Glu, His, Lys, and Ser. In an especially preferred embodiment, a nanocatalyst comprises aspartic acid and histidine attached to a nanoparticle (see FIG. 1E). Furthermore, a nanocatalyst may comprise three or more different amino acids, selected from the group listed above. In embodiments comprising two or more different amino acids, the amino acids may be attached to the nanoparticle such that their side chains are positioned in close proximity to each other, whereby the reactive side chains may interact cooperatively to catalyze a chemical reaction. In particular, the interaction between an acidic group and a basic group on the side chains of two adjacent amino acids may cooperatively catalyze a reaction. Alternatively, the interaction between an acidic group and a neutrophilic group on the side chains of two adjacent amino acids may cooperatively catalyze a reaction. The ratio of the amino acids attached to the nanoparticle can and will vary depending upon the application. For most applications, however, an equimolar amount of each amino acid may be optimal.

(c) Linkage Between the Reactive Species and the Nanoparticle

Depending upon the embodiment, the reactive species may be attached to the nanoparticle by a variety of chemical bonds, including but not limited to, covalent bonding, dative bonding, ionic bonding, hydrogen bonding, or van der Waals bonding. In an exemplary embodiment, the reactive species is attached by a covalent bond.

The reactive species or the compound comprising the reactive species may be attached directly to the nanoparticle. One skilled in the art will appreciate that the nature of the nanoparticle material will determine the type of bond utilized for a direct attachment. Alternatively, the reactive species may be attached to the nanoparticle by a linker. Typically, a linker is a molecule having at least two functional groups, such that the linker is disposed between the reactive species and the nanoparticle. Thus, one functional group of the linker forms an attachment with the nanoparticle, and another functional group of the linker forms an attachment with the reactive species or the compound comprising the reactive species. The type of bonds linking the reactive species to the nanoparticle via the linker can and will vary depending upon the reactive species, the linker, and the material of the nanoparticle. Furthermore, the size, length, charge, and/or hydrophilicity/phobicity of the linker can and will vary depending on the nanoparticle material, the reactive species, and the intended uses of the nanocatalyst.

In a preferred embodiment, the nanoparticle material comprises a metal oxide. A suitable linker comprises a molecule containing at least one hydroxyl group. Without being bound by any particular theory, hydroxyl groups have affinity for the undercoordinated surface sites of the metal oxide. Non-limiting examples of suitable hydroxyl-containing molecules include alcohols, diols, ethenediols, carboxylic acids, and hydroxides. In an especially preferred embodiment, the nanoparticle comprises the iron oxide, maghemite ($Fe_2O_3$) and the linker comprises the ethenediol, dopamine(4-(2-aminoethyl)benzene-1,2-diol) (see FIG. 1). In another especially preferred embodiment, the nanoparticle comprises maghemite and the linker comprises silicon hydroxide (see FIG. 1).

Figure 1H:
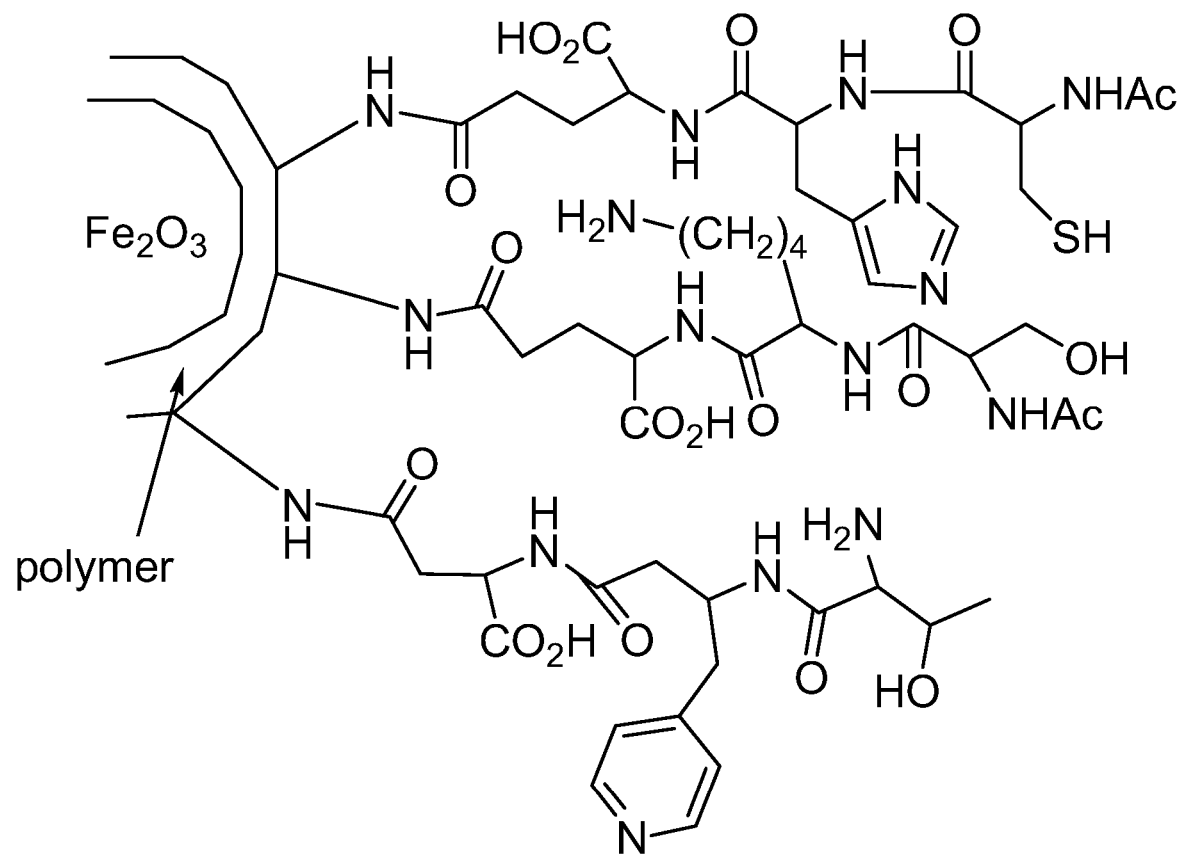
Figure 1I:
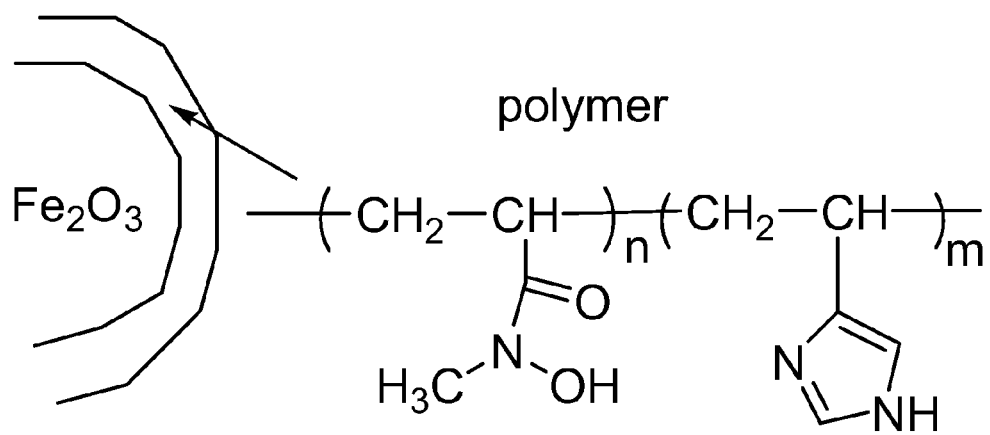

In yet another embodiment, the nanoparticle may be coated with a polymer, and the reactive species is attached to the nanoparticle via the polymer (see FIG. 1H, I). The polymer may be a synthetic polymer, a semisynthetic polymer, or a natural polymer. Suitable polymers were listed above in section (I)(a). The reactive species may be attached directly to the polymer, via a reactive group in the polymer. Alternatively, the reactive species may be attached to the polymer via a linker, as detailed above.

Figure 1J:
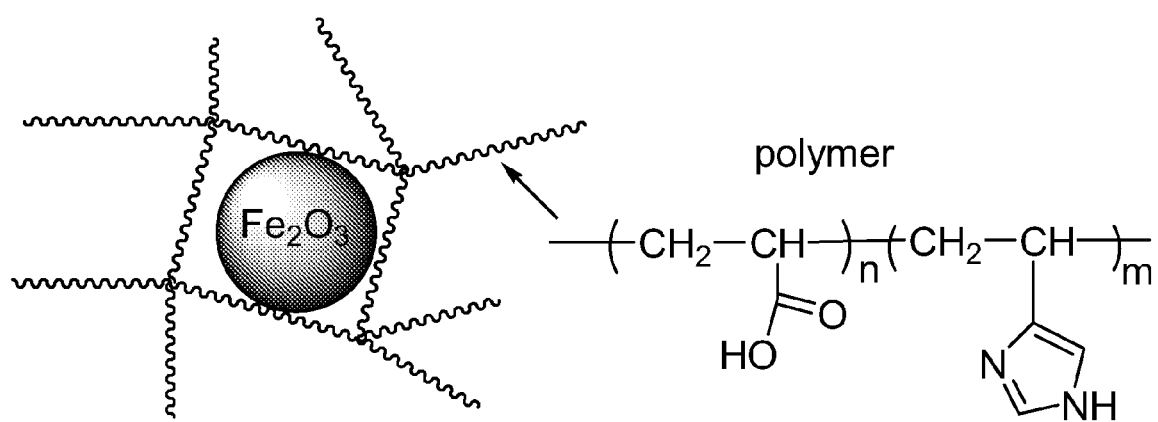

In still another embodiment, the nanoparticle may be dispersed in at least one type of polymeric matrix, with the reactive species being attached to either the nanoparticle or the polymer of the matrix (see FIG. 1J).

(d) Preferred Embodiments

As detailed above, a nanocatalyst of the invention comprises at least one reactive species attached to a nanoparticle. Table A lists various combinations of nanoparticles and reactive species that form nanocatalysts. Preferred nanocatalysts comprise amino acids with reactive side chains attached to a metal oxide nanoparticle. An exemplary nanocatalyst comprises equimolar amounts of aspartic acid and histidine attached to an iron oxide (maghemite) nanoparticle. Another exemplary nanocatalyst comprises a palladium-containing compound attached to an iron oxide (maghemite) nanoparticle.

TABLE A

| Nanoparticle Material | Reactive Species |
| --- | --- |
| nonmagnetic | catalyst atom |
| nonmagnetic | palladium |
| nonmagnetic | acidic group |
| nonmagnetic | basic group |
| nonmagnetic | nucleophilic group |
| nonmagnetic | amino acid |
| nonmagnetic | Asp |
| nonmagnetic | Cys |
| nonmagnetic | Glu |
| nonmagnetic | His |
| nonmagnetic | Lys |
| nonmagnetic | Ser |
| nonmagnetic | a combination of any two of the following: Asp, Cys, Glu, His, Lys, Ser |
| nonmagnetic | Asp, His |
| nonmagnetic | a combination of any three of the following: Asp, Cys, Glu, His, Lys, Ser |
| magnetic | catalyst atom |
| magnetic | palladium |
| magnetic | acidic group |
| magnetic | basic group |
| magnetic | nucleophilic group |
| magnetic | amino acid |
| magnetic | Asp |
| magnetic | Cys |
| magnetic | Glu |
| magnetic | His |
| magnetic | Lys |
| magnetic | Ser |
| magnetic | a combination of any two of the following: Asp, Cys, Glu, His, Lys, Ser |
| magnetic | Asp, His |
| magnetic | a combination of any three of the following: Asp, Cys, Glu, His, Lys, Ser |
| metal oxide | catalyst atom |
| metal oxide | palladium |
| metal oxide | acidic group |
| metal oxide | basic group |
| metal oxide | nucleophilic group |
| metal oxide | amino acid |
| metal oxide | Asp |
| metal oxide | Cys |
| metal oxide | Glu |

TABLE A-continued

| Nanoparticle Material | Reactive Species |
|---|---|
| metal oxide | His |
| metal oxide | Lys |
| metal oxide | Ser |
| metal oxide | a combination of any two of the following: Asp, Cys, Glu, His, Lys, Ser |
| metal oxide | Asp, His |
| metal oxide | a combination of any three of the following: Asp, Cys, Glu, His, Lys, Ser |
| iron oxide | catalyst atom |
| iron oxide | palladium |
| iron oxide | acidic group |
| iron oxide | basic group |
| iron oxide | nucleophilic group |
| iron oxide | amino acid |
| iron oxide | Asp |
| iron oxide | Cys |
| iron oxide | Glu |
| iron oxide | His |
| iron oxide | Lys |
| iron oxide | Ser |
| iron oxide | a combination of any two of the following: Asp, Cys, Glu, His, Lys, Ser |
| iron oxide | Asp, His |
| iron oxide | a combination of any three of the following: Asp, Cys, Glu, His, Lys, Ser |
| magnetite ($Fe_3O_4$) | catalyst atom |
| magnetite ($Fe_3O_4$) | palladium |
| magnetite ($Fe_3O_4$) | acidic group |
| magnetite ($Fe_3O_4$) | basic group |
| magnetite ($Fe_3O_4$) | nucleophilic group |
| magnetite ($Fe_3O_4$) | amino acid |
| magnetite ($Fe_3O_4$) | Asp |
| magnetite ($Fe_3O_4$) | Cys |
| magnetite ($Fe_3O_4$) | Glu |
| magnetite ($Fe_3O_4$) | His |
| magnetite ($Fe_3O_4$) | Lys |
| magnetite ($Fe_3O_4$) | Ser |
| magnetite ($Fe_3O_4$) | a combination of any two of the following: Asp, Cys, Glu, His, Lys, Ser |
| magnetite ($Fe_3O_4$) | Asp, His |
| magnetite ($Fe_3O_4$) | a combination of any three of the following: Asp, Cys, Glu, His, Lys, Ser |
| maghemite ($Fe_2O_3$) | catalyst atom |
| maghemite ($Fe_2O_3$) | palladium |
| maghemite ($Fe_2O_3$) | acidic group |
| maghemite ($Fe_2O_3$) | basic group |
| maghemite ($Fe_2O_3$) | nucleophilic group |
| maghemite ($Fe_2O_3$) | amino acid |
| maghemite ($Fe_2O_3$) | Asp |
| maghemite ($Fe_2O_3$) | Cys |
| maghemite ($Fe_2O_3$) | Glu |
| maghemite ($Fe_2O_3$) | His |
| maghemite ($Fe_2O_3$) | Lys |
| maghemite ($Fe_2O_3$) | Ser |
| maghemite ($Fe_2O_3$) | a combination of any two of the following: Asp, Cys, Glu, His, Lys, Ser |
| maghemite ($Fe_2O_3$) | Asp, His |
| maghemite ($Fe_2O_3$) | a combination of any three of the following: Asp, Cys, Glu, His, Lys, Ser |

II. Method for Using a Nanocatalyst to Catalyze a Chemical Reaction

A further aspect of the invention encompasses methods for using the nanocatalysts of the invention to catalyze chemical reactions. These nanocatalysts may catalyze many different types of chemical reactions, but more importantly, these nanocatalysts may catalyze biological reactions that are generally catalyzed by enzymes. Furthermore, magnetic nanocatalysts may be readily separated and recovered from the reaction mix or the product using an external magnet, such that the nanocatalyst may be recycled and reused.

(a) Types of Reactions

Nanocatalysts may be engineered to catalyze a plethora of chemical reactions. The chemical reaction may be a combination reaction, a decomposition reaction, or a replacement reaction. Many such reactions are widely used in industry. Non-limiting examples of such reactions include oxidative-reductive reactions, condensation reactions, coupling reactions, hydrolysis reactions, and dehydration reactions.

It has been discovered that nanocatalysts of the invention may be used to catalyze the hydrolysis of ester bonds, phosphoester bonds, and phosphodiester bonds (see Example 2). One skilled in the art will appreciate that the hydrolysis of many other types of bonds may be catalyzed by these nanocatalysts. Non-limiting examples of other hydrolysable bonds include thioester, acyl halide, alkyl halide, aryl halide, amide, acidic anhydride, ether, thioether, phosphohalide, sulfonyl halide, sulfinyl halide, sulfenyl halide, acetal, thioacetal, thioketal, ketal, hemiacetal, thiohemiacetal, hemiketal, thiohemiketal, cyano bonds, and derivatives thereof. Another bond whose hydrolysis may be catalyzed by these nanocatalysts may be diagrammed as —$X^2$-LG, wherein $X^2$ is I C, P, I, Br, Cl, B, Al, N, O, S, Se, As, Si, or Ge and "LG" is a leaving group. A leaving group generally relates to the part of a substrate molecule that is cleaved and generally has the ability to attract electrons and/or negative charges. Non-limiting examples of leaving groups include acetate(—$OCOCH_3$), halogens(—F, —Cl, —Br, and —I), trifluoroactetate (—$OCOCF_3$), methansulfonate(—O—$SO_2CH_3$), tosylate (—$OSO_2C_6H_4CH_3$), nitrosulfonate(—$OSO_2C_6H_4NO_2$), and triflate(—$OSO_2CF_3$).

(b) Reaction Conditions

The nanocatalysts of the invention generally function under mild reaction conditions. Traditionally, many chemical reactions are performed at extreme pH values, elevated temperatures, in the presence of caustic reagents, toxic organic solvents, and/or heavy metals. In contrast, reactions catalyzed by the nanocatalysts of the invention are generally performed at a neutral pH, a moderate temperature, and in an aqueous solution (see Example 2). Depending upon the application, a reaction mixture may further comprise a buffering agent, a cation, a surfactant, an organic solvent, a reducing agent, or a co-reactant. As will be appreciated by one skilled in the art, the reactions conditions and reaction components will vary depending upon the application.

The pH of the reaction may range from about 5.0 to about 9.0, preferably from about 6.0 to about 8.0, and more preferably at about 6.5 to about 7.5. The temperature of the reaction may range from about 20° C. to about 80° C., preferably from about 25° C. to about 65° C., and more preferably from about 30° C. to about 45° C. The duration of the reaction may range from about 1 hour to about 96 hours, preferably from about 6 hours to about 72 hours, and more preferably about 12 hours to about 48 hours. In one embodiment, the pH of the reaction may be about 6.5 to about 7.5, the temperature of the reaction may be about 25° C. to about 30° C., and the duration of the reaction may be about 24 hours to about 48 hours. In yet another embodiment, the pH of the reaction may be about 6.5 to about 7.5, the temperature of the reaction may be about 37° C., and the duration of the reaction may be about 24 hours to about 48 hours.

The efficiency of the nanocatalyst, which may be assessed as the percent of conversion of the substrate to the product, will generally be at least 50%. The percent of conversion may be about 60%, 70%, 80%, 85%, 90%, 95%, or 99%. Preferably, the percent of conversion may be at least 75%.

(c) Recovery of the Nanocatalyst

Magnetic nanocatalysts may be separated from the reaction mixture or the product by applying an external magnet. Thus, the nanocatalyst may be readily recovered, concentrated, recycled, and reused repeatedly. The product of the reaction may be isolated and/or purified from the reaction mixture by a variety of techniques well known in the art.

(d) Applications

In one embodiment, a nanocatalyst of the invention may be used to catalyze the hydrolysis of an environmental pollutant, whereby the environmental pollutant is inactivated. The environmental pollutant may be a pesticide, an insecticide, an herbicide, or an insect repellent. Non-limiting examples of environmental pollutants include paraoxon, parathion, methyl parathion, malathion, methoprene, DEET, atrazine, azinophos-methyl, diazinon, O-chlorobenzylmalononitrile, and derivatives thereof (see Table B). The environmental pollutant may be in surface water, ground water, or the soil. Alternatively, the environmental pollutant may not be dispersed in the environment but may still be in need of inactivation (e.g., in a storage facility). Thus, a nanocatalyst of the invention may hydrolyze and inactivate the environmental pollutant in water, soil, or another medium at ambient temperatures. Additional reagents, such as divalent cations, may be also be added. Upon completion of the reaction, a magnetic nanocatalyst may be recovered magnetically from the reaction medium, recycled, and reused.

TABLE B

| Chemical Structure | Common Name | Chemical Name |
|---|---|---|
| | Paraoxon | (diethyl p-nitrophenylphosphate) |
| | Parathion | (diethyl p-nitrophenyl monothiophosphate) |
| | Methyl parathion | (dimethyl p-nitrophenyl monothiophosphate) |
| | | O-chlorobenzyl-malononitrile |
| | Malathion | ([(dimethoxyphosphinothioyl)thio] butanedioic acid, diethyl ester) |
| | Methoprene | ((E,E)-11-methoxy-3,7,11-trimethyl-2,4-do-decadienoic acid, 1-methylethyl ester) |
| | DEET | (N,N-diethyl-3-methylbenzamide) |

TABLE B-continued

| Chemical Structure | Common Name | Chemical Name |
|---|---|---|
| | Atrazine | (2-chloro-4-ethylamino-6-isopropyl-amine-s-triazine) |
| | Azinphos-methyl | (phosphorodithioic acid, O,O-dimethyl S-[(4-oxo-1,2,3-benzotriazin-3(4H)-yl)methyl]ester) |
| | Diazinon | phosphorothioic acid O,O-diethyl O-[6-methyl-2-(1-methylethyl)-4-pyrimidinyl] ester |

In an alternate embodiment, a nanocatalyst of the invention may be used to catalyze the hydrolysis or inactivation of a chemical warfare agent. Non-limiting examples of chemical warfare agents include Sarin, Lewisite, Soman, Tabun, VX, chloroacetophenone($ClC_6H_4COCH_3$), bromobenzylcyanide ($BrC_6H_4CH_2CN$), and derivatives thereof. These and other examples of chemical warfare agents are presented in Table C. As described above for the environmental pollutants, a nanocatalyst may inactivate a chemical warfare agent in water or soil under mild reaction conditions. Furthermore, a magnetic nanocatalysts may be magnetically recovered and recycled.

TABLE C

| Chemical Structure | Common Name | Chemical Name |
|---|---|---|
| | Sarin (GB) | (methylphosphonofluoridic acid 1-methylpropylester) |
| | Lewisite | dichloro((E)-2-chlorovinyl)arsine |
| | Soman (GD) | (methylphosphonofluoridic acid, 1,2,2-trimethylpropylester) |
| | Tabun (GA) | (dimethylphosphoramido-cyanidic acid, ethyl ester) |

TABLE C-continued

| Chemical Structure | Common Name | Chemical Name |
|---|---|---|
| | VX | (methylphosphonothioic acid, S-[2-[bis-(1-methylethyl)amino]-o-ethyl ester]) |
| | | cyclohexyl methylphosphonofluoridate (GF) |
| | | phosphonofluoridic acid, ethyl-, isopropyl ester (GE) |
| | | Phosphonothioic acid, ethyl-S-(2-(diethylamino)ethyl) O-ethyl ester |
| | Amiton | S-2-(diethylamino)ethyl O,O-diethyl phosphorothioate |
| | VM | S-2-(diethylamino)ethyl O-ethyl methyl-phosphonothioate |
| | Russian VX | S-2-(diethylamino)ethyl O-isobutyl methyl-phosphonothioate |
| | | (ethylbis(2-chloroethyl)amine) |
| | Mechloreth-amine | (2-chloro-N-(2-chloroethyl)-N-methylethanamine) |

TABLE C-continued

| Chemical Structure | Common Name | Chemical Name |
|---|---|---|
| (structure) | Trichlormethine | (tris(2-chloroethyl)amine) |
| (structure) | Dichloroformoxine | hydroxycarbonimidic dichloride |
| (structure) | | diphenylcyanoarsine |
| N≡—Cl | | cyanogen chloride |
| ≡N | | hydrogen cyanide |
| Cl—Cl | | chlorine |
| (structure) | | trichloronitromethane |
| (structure) | Diphosgene | (trichloromethyl chloroformate) |
| (structure) | | methyldichloroarsine |
| (structure) | | phosgene |
| (structure) | Sulfur Mustard | (1,1'-thiobis(2-chloroethane)) |
| (structure) | | (1-(2-(2-(2-chloroethylthio)ethoxy)-ethylthio)-2-chloroethane) |
| (structure) | | ethyldichloroarsine |
| $AsH_3$ | Arsine | (arsenic trihydride) |

In still another embodiment, a nanocatalyst of the invention may be used to catalyze the hydrolysis of esters in chemical industrial processes. As an example, a magnetic nanocatalyst may be utilized in an industrial saponification process. In general, industrial saponification refers to the hydrolysis of a fatty acid ester into an alcohol and the salt of a carboxylic acid (also called a soap). Generally, vegetable oils and animal fats, which are primarily triglycerides comprising glycerol esterified with three fatty acids, are the starting materials. Typically, an industrial saponification process is performed in the presence of a strong base (NaOH or KOH) and heat. The products comprise free glycerol and fatty acid salts. A nanocatalyst of the invention may be used to catalyze the hydrolysis of the triglycerides at a neutral pH and at a moderate temperature in the presence of a cation. A magnetic nanocatalyst may be recovered and reused.

In yet another embodiment, a nanocatalyst of the invention may be used to catalyze the hydrolysis of a phosphodiester bond in a nucleic acid. The nucleic acid may comprise deoxyribonucleotides or ribonucleotides, or a combination thereof. The nucleic acid may be single-stranded or double-stranded. Non-limiting examples of ribonucleic acids (RNA) include messenger RNA (mRNA), micro RNA (miRNA), short interfering RNA (siRNA), and viral RNA. The hydrolysis of a phosphodiester bond in a nucleic acid may be targeted to a specific sequence by also attaching an oligonucleotide, whose sequence is complementary to the sequence of the target nucleic acid, to the nanoparticle. Thus, the oligonucleotide attached to the nanoparticle may hybridize with the target nucleic acid, such that the reactive species attached to the nanoparticle catalyzes the hydrolysis of a phosphodiester bond in the target nucleic acid.

The oligonucleotide attached to the nanoparticle may comprise deoxyribonucleotides, ribonucleotides, or a combination thereof. The nucleotides comprising the oligonucleotide may be standard nucleotides or non-standard nucleotides, and the nucleotides may be modified or derivatized nucleotides. The nucleotides may be linked by phosphodiester bonds or non-hydrolysable bonds, such as phosphorothioate or methylphosphonate bonds. The oligonucleotide may also comprise morpholinos, which are synthetic molecules in which bases are attached to morpholino rings that are linked through phosphorodiamidate groups. The oligonucleotide may also comprise alternative structural types, such as peptide nucleic acids (PNA) or locked nucleic acids (LNA). The length of the oligonucleotide may range from about 4 nucleotides to about 30 nucleotides, and more preferably from about 8 nucleotides to about 18 nucleotides.

As detailed above, the nucleic acid hydrolysis reactions may be performed under mild conditions. The reactions may be performed in vitro. The reactions may also be performed in vivo, for example, in humans, animals, or plants. The method may further comprise an initial heating step to denature the target nucleic acid, such that the target nucleic acid may hybridize with the oligonucleotide attached to the nanoparticle. Upon completion of the reaction, the method may further comprise another heating step to denature and release the cleaved product from the oligonucleotide attached to the nanoparticle. Magnetic nanocatalysts may be recovered and reused, as described above. One skilled in the art will appreciate the applications of this embodiment. For example, a nanocatalyst may be targeted to cleave a viral RNA molecule, such as HIV-1 tar RNA. Further, nanocatalysts may be engineered for use in antisense therapies for disease treatments.

(III) Method for Using a Nanocatalyst to Catalyze a Multiple Phase Reaction

Yet another aspect of the present invention provides methods for using the nanocatalysts of the invention to catalyze multiple phase reactions. Multiple phase reactions may comprise two phases, wherein a first reagent is immobilized on a matrix and a second reagent is immobilized on a nanocatalyst. Alternatively, multiple phase reactions may comprise three phases, wherein a first reagent is immobilized on a matrix, a second reagent is immobilized on a nanocatalyst, and a third reagent is either in solution or immobilized on a second matrix. One skilled in the art will appreciate that multiple phase reactions may also comprise four phases, five phases, and so forth.

The composition of the matrix can and will vary depending upon the application and the reaction being catalyzed. The matrix may comprise a synthetic solid phase resins, such as 1-2% divinylbenzene crosslinked polystyrene and its derivatives, or non-crosslinked polystyrene and its derivatives. The matrix may also comprise a synthetic or a semisynthetic polymer, as detailed above in section (I)(a). Another suitable polymer is a ROMP gel, which is synthesized by ring-opening metathesis polymerization reactions. The matrix may comprise sol-gels, which are porous materials consisting of inorganic oxides such as silica, alumina, zirconia, stannic or tungsten oxide, or mixtures thereof. Sol-gels that contain uniform pore dimensions are generally termed monolithic sol-gels. The matrix may also comprise aerogels, which are porous materials consisting of inorganic oxides such as silica, alumina, zirconia, stannic or tungsten oxide, or mixtures thereof. The pores of aerogels are usually filled with air instead of solvents and water. The matrix may also comprise silica gels, glass beads, zeolites, graphites, or derivatives thereof. Lastly, the matrix may also comprise fluorotags, which usually refer to organic functionalities or molecules containing multiple fluoro atoms or polymers that have multiple fluoro atoms. Examples of molecules containing fluorotags are 4-[3-(perfluorooctyl)propyl-1-oxy]benzyl alcohol and bis[diphenyl-[4-(1H, 1H, 2H, 2H-perfluorodecyl)phenyl]phosphine]palladium (II) chloride. Both molecules contain a $C_8F_{17}$ group.

A wide variety of chemical reactions may be performed using multiple phase technologies. Non-limiting examples include coupling reactions, condensation reactions, replacement reactions, dehydration reactions, and hydrolysis reactions. In particular, multiple phase reactions may be used to synthesize many different types of molecules. For example, biopolymers (i.e., polypeptides, nucleic acids), synthetic polymers, small organic molecules, etc. may be synthesized in multiple phases. Thus, the nanocatalysts of the invention, rather than traditional catalysts, may be used in a variety of multiple phase chemical reactions.

In one embodiment, the method comprises contacting a nanocatalyst with a substrate immobilized on a matrix. The nanocatalyst comprises at least one reactive species attached to a nanoparticle, whereby the reactive species catalyzes the reaction to generate a product. The product may be immobilized on the matrix or the product may be in solution. If the nanocatalyst is magnetic, then the nanocatalyst may be magnetically separated from the matrix and the product, such that the nanocatalyst may be recycled and reused.

In another embodiment, the method further comprises contacting the nanocatalyst and the immobilized first substrate with a second substrate. The second substrate may be in solution or the second substrate may be immobilized on a second matrix. As an example, the reaction may be a Suzuki cross-coupling reaction (see Example 4). For this reaction, the first substrate that is immobilized on a matrix may be an aryl halogen, and the second, soluble, substrate may be an arylboronic acid. The nanocatalyst may comprise palladium (i.e., Pd—NHC) attached to a metal oxide nanoparticle (see Example 3). The reaction may be performed at pH values that range from about 6.0 to about 9.0. The temperature of the reaction may range from about 20° C. to about 100° C. The duration of the reaction may range from about 1 hour to about 10 days. In a preferred embodiment, the pH of the reaction may be about 7.0, the temperature of the reaction may be about 80° C., and the duration of the reaction may be about 6 days.

IV. A Process for Making a Nanocatalyst

Still another aspect of the present invention encompasses a method for making a nanocatalyst comprising at least one reactive species attached to a metal oxide nanoparticle. The method comprises mixing one hydroxyl-containing compound carrying the reactive species with a metal oxide nanoparticle coated with a hydrophobic surfactant. During the mixing step, the hydroxyl-containing compound replaces the hydrophobic surfactant on the surface of the metal oxide nanoparticle, thus forming the nanocatalyst (see Example 1 and Example 3).

The hydroxy-containing compound may be an alcohol, a diol, an ethenediol (e.g, dopamine), a carboxylic acid, or a hydroxide. In a preferred embodiment, the hydroxy-containing compound may be dopamine. In another preferred embodiment, the hydroxy-containing compound may be silicon hydroxide.

The reactive species may be an amino acid with a reactive side chain, such as aspartic acid, cysteine, glutamic acid, histidine, lysine, and serine. The reactive species may also be a compound containing a catalyst atom, such as palladium. Methods known in the art may be used to couple the reactive species-containing compound to the hydroxy-containing compound.

The hydrophobic surfactant coating the metal oxide nanoparticle may be a saturated long chain fatty acid, an unsaturated long chain fatty acid, or a mixture thereof. The fatty acid may comprise from about 14 carbons to about 22 carbons. In a preferred embodiment, the hydrophobic surfactant may be oleic acid. The metal oxide nanoparticle may be an iron oxide, such as magnetite ($Fe_3O_4$) or maghemite ($Fe_2O_3$).

The process comprises mixing the derivatized hydroxyl-containing compound and the coated nanoparticle. The mixing may comprise sonication for a period of time. The time may range from about 0.5 hour to about 15 hours, preferably from about 2 hours to 10 hours, and more preferably about 6 hours. During the mixing step the hydroxyl-containing compounds replace the oleic acid molecules coating the surface of the nanoparticle, such that the hydroxyl-containing compounds become attached to the surface of the nanoparticle.

Definitions

To facilitate understanding of the invention, a number of terms are defined below:

The term "alkyl" embraces linear, cyclic or branched hydrocarbon radicals having one to about twenty carbon atoms or, preferably, one to about twelve carbon atoms. Examples of such radicals include methyl, ethyl, n-propyl, isopropyl, n-butyl, isobutyl, sec-butyl, tert-butyl, pentyl, isoamyl, hexyl and the like.

The term "alkenyl" embraces linear or branched hydrocarbon radicals having at least one carbon-carbon double bond of two to about twenty carbon atoms or, preferably, two to about twelve carbon atoms. Examples of alkenyl radicals include ethenyl, propenyl, allyl, propenyl, butenyl and 4-methylbutenyl.

The term "alkynyl" denotes linear or branched carbon or hydrocarbon radicals having at least one carbon-carbon triple bond of two to about twenty carbon atoms or, preferably, two to about twelve carbon atoms. Examples of such radicals include propargyl, butynyl, and the like.

The term "aryl" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl.

A "catalyst" refers to a substance that enables a chemical or biological reaction to proceed at a faster rate or under different conditions (as at a lower temperature) than otherwise possible. The catalyst itself is not consumed during the overall reaction.

"Complimentary" refers to the natural association of nucleic acid sequences by base-pairing (5'-A G T-3' pairs with the complimentary sequence 3'-T C A-5'). Complementarity between two single-stranded molecules may be partial, if only some of the nucleic acids pair are complimentary, or complete, if all bases pair are complimentary.

The term "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring.

The term "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The term "hybridize" refers to the process of annealing, base pairing, or hydrogen bonding between the nucleotides of two single stranded nucleic acids.

The term "hydrolyzing" or "hydrolyze" or "hydrolysis" refers to a chemical process of decomposition involving the splitting of a bond and the addition of the hydrogen cation and the hydroxide anion of water or the alkoxide or aryloxide anion of an alcohol or the thiolate ion of a thiol alcohol.

The term "linker" as used herein refers to a molecule with at least two functional groups, such that the linker is disposed between the reactive species (or a compound containing the reactive species) and the nanoparticle.

The term "nucleic acid," as used herein, refers to sequences of linked nucleotides. The nucleotides may be deoxyribonucleotides or ribonucleotides. The nucleic acid may be single-stranded or double-stranded.

The term "oligonucleotide" refers to a short nucleic acid, i.e., less than about 50 nucleotides.

A "polymer" is a chemical compound or mixture of compounds consisting essentially of repeating structural units. Polymers include, but are not limited to natural, synthetic, and semi-synthetic polymers.

The "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, carbocycle, aryl, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters and ethers.

The following examples are included to demonstrate preferred embodiments of the invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the spirit and scope of the invention, therefore all matter set forth or shown in the accompanying drawings is to be interpreted as illustrative and not in a limiting sense.

EXAMPLES

The following examples illustrate various embodiments of the invention.

Example 1

Synthesis of Iron Oxide Nanoparticle-Amino Acid Complexes

Chemicals and organic solvents mentioned below were purchased from Aldrich (Milwaukee, Wis.) or Acros Organics (Pittsburgh, Pa.) and used as received. Water was obtained from a Milli-Q water system purchased from Millipore Corporation (Milford, Mass.). The heavy metal and bacterial contaminant levels in Milli-Q water were below 10 parts per billion. Permanent magnets were purchased from Dexter Magnetic Technologies Inc. (Elk Grove Village, Ill.).

Figure 2:
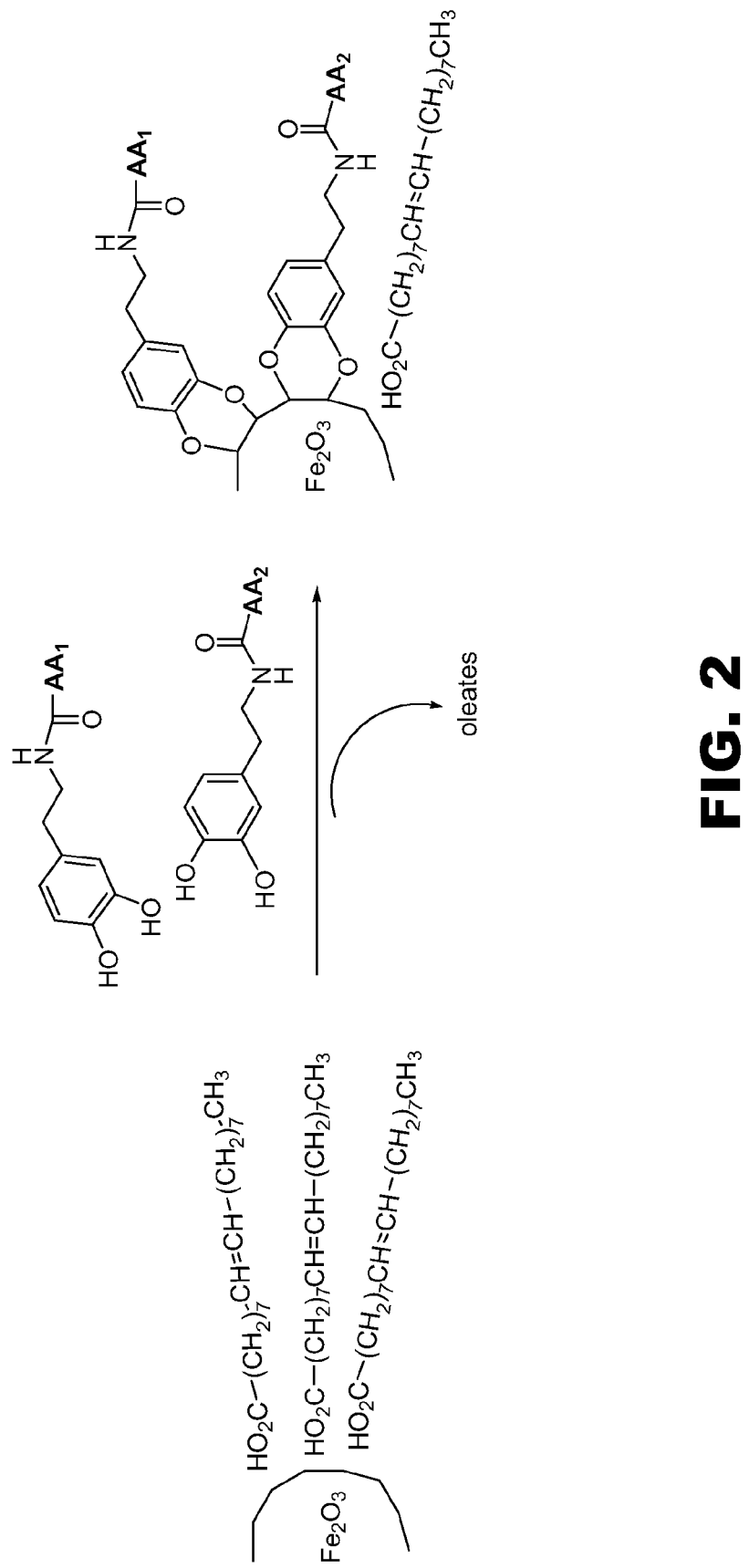
FIG. 2 illustrates the surface-exchange reaction during the synthesis of a nanocatalyst comprising amino acids (AA) attached to an iron oxide nanoparticle. The amino acid-derived dopamine molecules replace the oleic acid molecules on the surface of the nanoparticle.

To generate amino acid-linked nanocatalysts, amino acids with a carboxylate, a basic or a nucleophilic group on the side chain, such as Asp, Glu, His, and Lys, were attached to dopamine(4-(2-aminoethyl)benzene-1,2-diol) using standard procedures (Organic Letters 2006, 8, 3215). The a-amino groups of the amino acids were acylated to mimic the amide bonds of the enzyme backbones. Exchange-replacement reactions were conducted by mixing 0.06 mmol of an amino acid dopamine derivative in 1 mL of $CHCl_3$ and 1 mL of methanol with 60 mg of ~12-nm maghemite, ($Fe_2O_3$) nanoparticles coated with oleate (Nature Mater. 2004, 3, 891; J. Colloid Interface Sci. 2003, 258, 427). For nanoparticles coated with two amino acids, 0.03 mmol of each amino acid residue was utilized in the exchange reaction. The mixture was sonicated for 6 h. The reaction is diagrammed in FIG. 2. Magnetic nanoparticles were magnetically concentrated and washed with $CH_2Cl_2$ (20 mL×4) and methanol (20 mL×4) sequentially.

Example 2

Figure 3C:
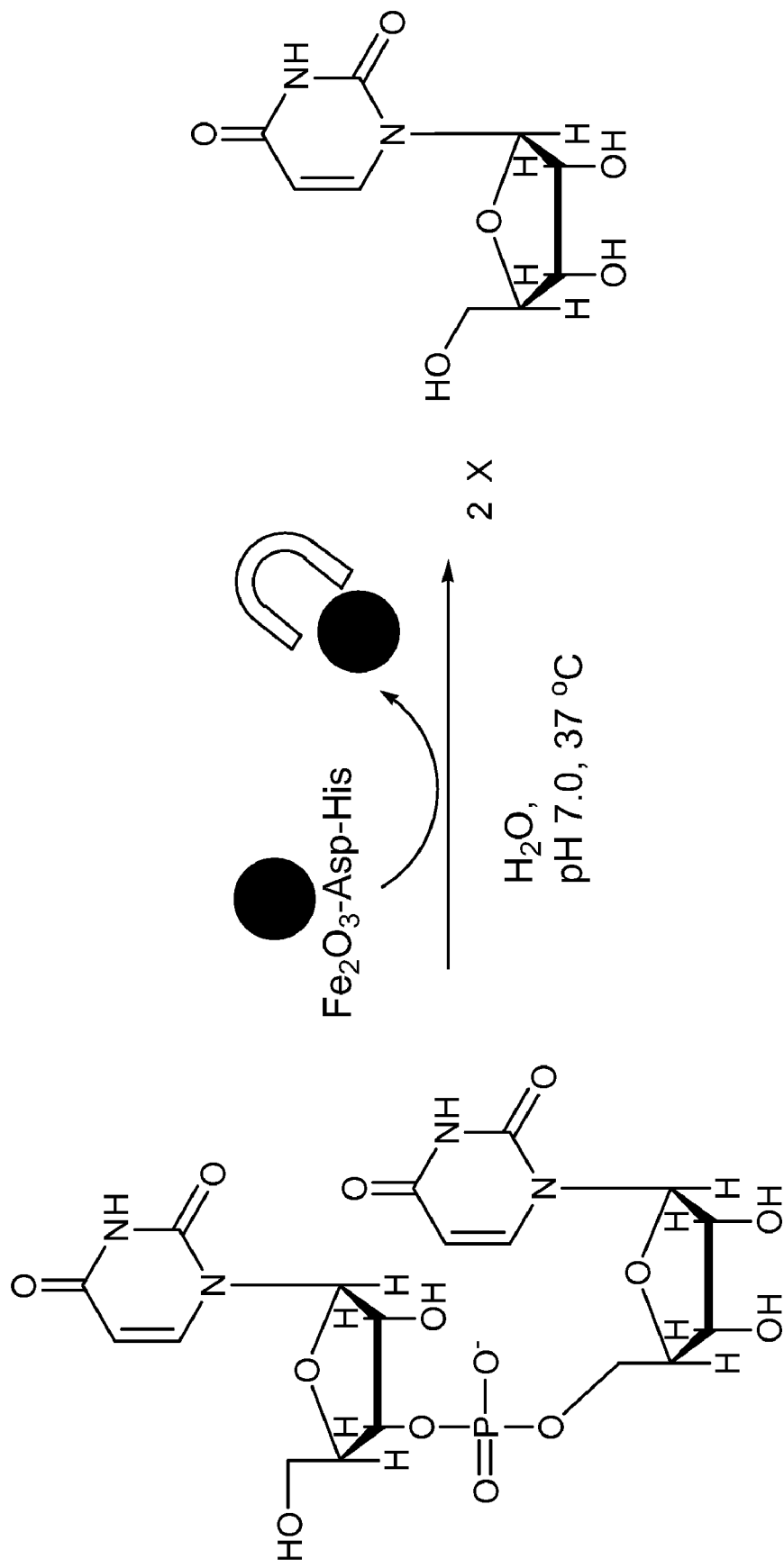
FIG. 3 diagrams reactions catalyzed by nanocatalysts comprising iron oxide nanoparticles linked to one or two amino acids. The black circle represents the nanocatalyst, which was removed by applying an external magnet (horseshoe symbol) upon completion of each reaction. A. Hydrolysis of the carboxylic ester bond of paraoxon (diethyl p-nitrophenylphosphate). B. Hydrolysis of the phosphoester bond of 4-nitrophenyl acetate. C. Hydrolysis of the phosphodiester bond in the RNA construct, UpU. D. Hydrolysis of the phosphodiester bond in the DNA construct, dApdT.

Catalysis of Phosphoester, Carboxylic Ester, and Phosphodiester Bonds by Iron Oxide Nanoparticle-Amino Acid Complexes The maghemite nanoparticle-amino acid complexes prepared in Example 1 were used to catalyze hydrolysis reactions using paraoxon(diethyl p-nitrophenylphosphate), 4-nitrophenyl acetate, an RNA construct (UpU), or a DNA construct (dApdT) as substrates (FIG. 3). The general procedure involved introducing a nanocomplex (amino acid concentration 0.06 mM) to a solution of substrate (0.5 mM) in 2 mL of Milli-Q water at 37° C. After 48 h, the nanocomplex was magnetically concentrated and removed from the solution (Org. Lett. 2006, 8, 3215). The solution was then subjected to HPLC analyses using an internal standard for the conversion yield of the substrate. The structures of the hydrolytic products were confirmed by LC-MS experiments. Each experiment was repeated at least two times.

The hydrolysis of the phosphoester bond of paraoxon (FIG. 3A) by the different nanoparticle-amino acid complexes is presented in Table 1. Nanoparticles coated with Asp and His analogues ($Fe_2O_3$-Asp-His) (Entry 8, Table 1) exhibited the highest catalytic activity. For example, after 48 h, 77% of paraoxon was hydrolyzed using $Fe_2O_3$-Asp-His; after 96 h, a conversion yield of 92% was achieved. In contrast, a mixture of Asp and His without a nanoparticle support (Entry 20) led to a conversion yield of less than 1%. Within the margin of experimental error, the unsupported amino acid pair showed no catalytic activity in the hydrolysis of paraoxon. On the other hand, the nanoparticle support itself does not appear to be a catalyst, as entry 1 showed that after 48 h less than 1% of paraoxon was hydrolyzed by maghemite nanoparticles without a shell of amino acid coatings. Nanoparticles protected with other dyad pairs of amino acids (Entries 9-19, Table 1) were less active catalysts than $Fe_2O_3$-Asp-His. For example, the nanocomplex with Glu and His led to a conversion yield of 51% after 48 h (Entry 12), which is lower than that of a dyad of Asp and His despite the fact that the structures of Asp and Glu are similar to each other. Kinetic studies suggested that the hydrolysis of paraoxon by $Fe_2O_3$-Asp-His fits into the Michaelis-Mention model. Analysis of the Lineweaver-Burk plot gave $K_M$=1.1 mM and $k_{cat}$=4.3×10$^{-5}$s$^{-1}$ in a pH 7.4 buffer at 40° C. for $Fe_2O_3$-Asp-His. The $Fe_2O_3$-Asp-His nanocomplex was also used to catalyze the hydrolysis of paraoxon at ambient temperature (25° C.), was found to be about 10-fold slower than at 37° C.

TABLE 1

Cleavage of Paraoxon by 12 nm Maghemite Nanoparticle-Supported Amino Acids

| Entry | Amino Acid | Conversion Yield (%) |
|---|---|---|
| 1 | Nanoparticle[a] | <1 |
| 2 | Asp | 5 |
| 3 | Cys | 15 |
| 4 | Glu | <1 |
| 5 | His | 6 |
| 6 | Lys | 2 |
| 7 | Ser | 4 |
| 8 | Asp + His | 77/92[b] |
| 9 | Asp + Lys | 27 |
| 10 | Asp + Cys | 25 |
| 11 | Asp + Ser | 28 |
| 12 | Glu + His | 51 |
| 13 | Glu + Lys | 50 |
| 14 | Glu + Cys | 44 |
| 15 | Glu + Ser | 45 |
| 16 | His + Cys | 30 |
| 17 | His + Ser | 40 |
| 18 | Lys + Ser | 17 |
| 19 | Lys + Cys | 39 |
| 20 | Asp, His[c] | <1 |

[a]12 nm maghemite nanoparticles coated with oleate (no amino acids attached).
[b]Reaction time: 96 h.
[c]Un-supported Asp (0.14 mM) and His (0.14 mM) and paraoxon (0.5 mM) in 2 mL of Milli-Q water at 37° C. for 48 h.

Table 2 presents the cleavage of the carboxylic ester bond of 4-nitrophenyl acetate (FIG. 3B) by the nanoparticle-amino acid complexes. Most of the nanomplexes coated with pairs of amino acids were effective catalysts (Entries 8-18, Table 2), with conversion yields generally greater than 50%. The $Fe_2O_3$-Cys-Lys, $Fe_2O_3$-Lys-Ser, and $Fe_2O_3$-Asp-His nanocomplexes had the highest catalytic activity of 84%, 76%, and 67%, respectively. Nanoparticles coated with oleic acid and no hed amino acids (Entry 19) had no catalytic activity.

TABLE 2

Cleavage of 4-Nitrophenyl Acetate by 12 nm Maghemite Nanoparticle-Supported Amino Acids

| Entry | Amino Acid | Conversion Yield (%) |
|---|---|---|
| 1 | blank | <1 |
| 2 | Asp | 30 |
| 3 | Cys | 27 |
| 4 | Glu | 12 |

TABLE 2-continued

Cleavage of 4-Nitrophenyl Acetate by 12 nm Maghemite Nanoparticle-Supported Amino Acids

| Entry | Amino Acid | Conversion Yield (%) |
|---|---|---|
| 5 | His | 24 |
| 6 | Lys | 19 |
| 7 | Ser | 28 |
| 8 | Asp + His | 67 |
| 9 | Asp + Ser | 54 |
| 10 | Asp + Lys | 54 |
| 11 | Cys + His | 57 |
| 12 | Cys + Glu | 54 |
| 13 | Glu + Lys | 56 |
| 14 | Glu + Ser | 55 |
| 15 | Cys + Lys | 84 |
| 16 | His + Ser | 54 |
| 17 | Lys + Ser | 76 |
| 18 | Glu + His | 10 |
| 19 | Nanoparticle-oleate[a] | <1 |

[a]p-nitrophenyl acetate (1 mM) and maghemite nanoparticles coated with oleate (no amino acid residues on the surfaces) (2 mg) in 2 mL of pH 7.4 phosphate buffer (0.05 mM) at 35° C. for 12 h.

Figure 3D:
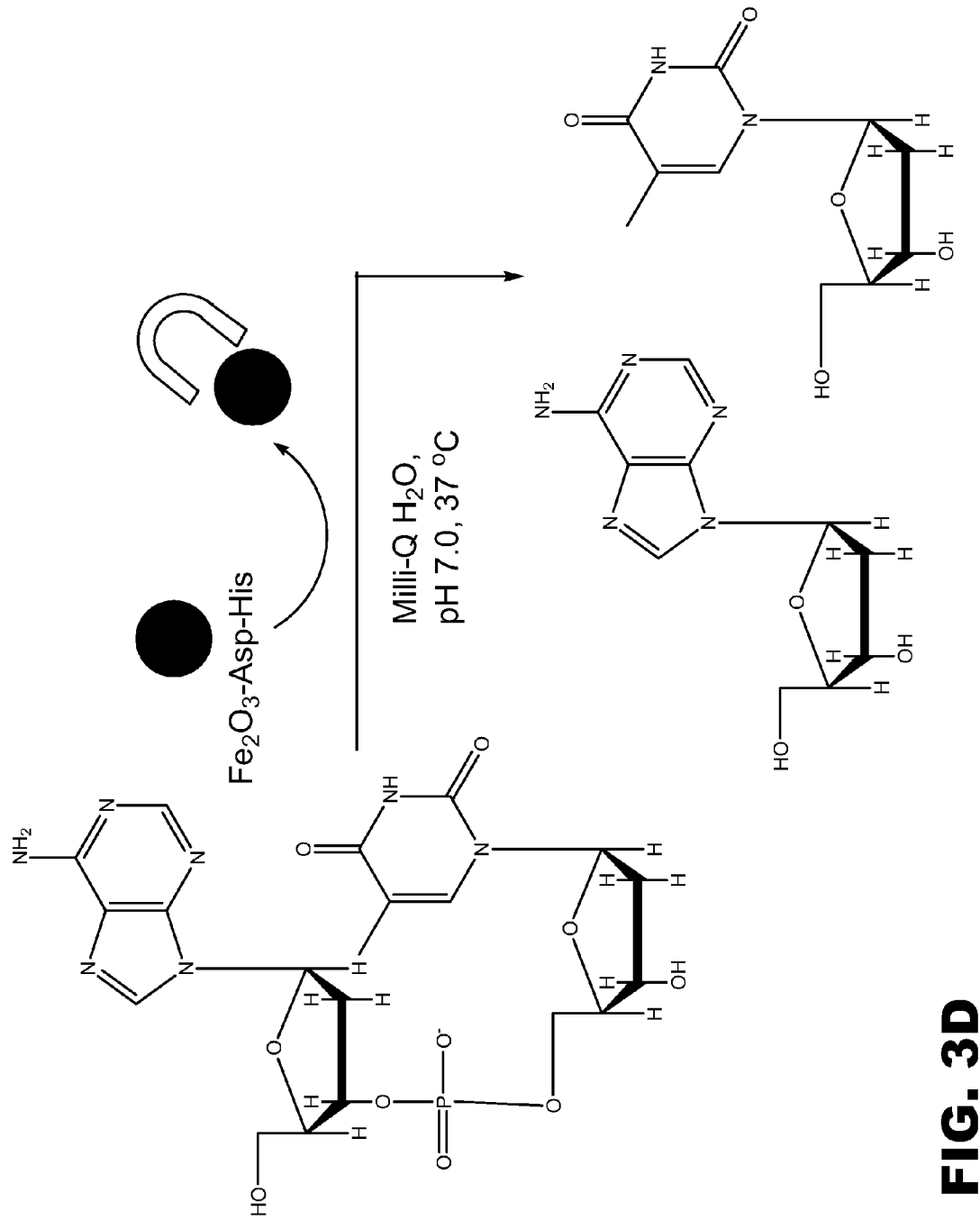

RNA or DNA constructs were exposed to the $Fe_2O_3$-Asp-His nanocomplex as detailed above. This nanocomplex completely hydrolyzed the phosphodiester bond of UpU (FIG. 3C) and dApdT (FIG. 3D).

Example 3

Synthesis of Iron Oxide Nanoparticle-Pd Complexes

To make the Pd-containing nanocomplexes, about 60 mg of 11-nm γ-$Fe_2O_3$ nanocrystals coated with oleate in 50 mL of chloroform was treated with (3-chloropropyl)trimethoxysilane (1 mL, 5.48 mmol). The resulting solution was then brought to reflux. After 12 h, the solution was cooled down to ambient temperature. Nanoparticles were magnetically concentrated by using an external permanent magnet and washed with toluene (2×50 mL), 0.1 M HCL (2×50 mL) and methanol (2×50 mL). The resulting nanoparticles were air-dried. Such nanoparticles were re-dissolved in 45 mL of dry toluene and then N-methylimidazole (0.75 mL, 9.41 mmol) in 5 mL of toluene was added. The resulting solution was brought to reflux and after 16 h, it was cooled down to room temperature. Nanoparticles were then magnetically concentrated and washed with toluene, HCl and methanol sequentially.

About 100 mg of the aforementioned magnetic nanoparticles were re-dissolved in a mixture of DMF (2 mL) and $Na_2CO_3$ aqueous solution (0.5 M, 2 mL) in the presence of Pd(OAc)$_2$ (22 mg, 98 μmol). After 16 h at 50° C., the mixture was cooled down to room temperature. The nanoparticle-Pd complexes were magnetically concentrated and washed with water (3×50 mL), 0.1 M HCl (3×50 mL), methanol (3×50 mL) and air-dried, The amount of Pd on the nanoparticles was determined via elemental analysis. TEM measurements and elemental analyses were employed for the structure of Iron Oxide-Pd.

Example 4

Use of Iron Oxide-Pd Complexes in Solid Phase Suzuki Cross-Coupling Reactions

Figure 4:
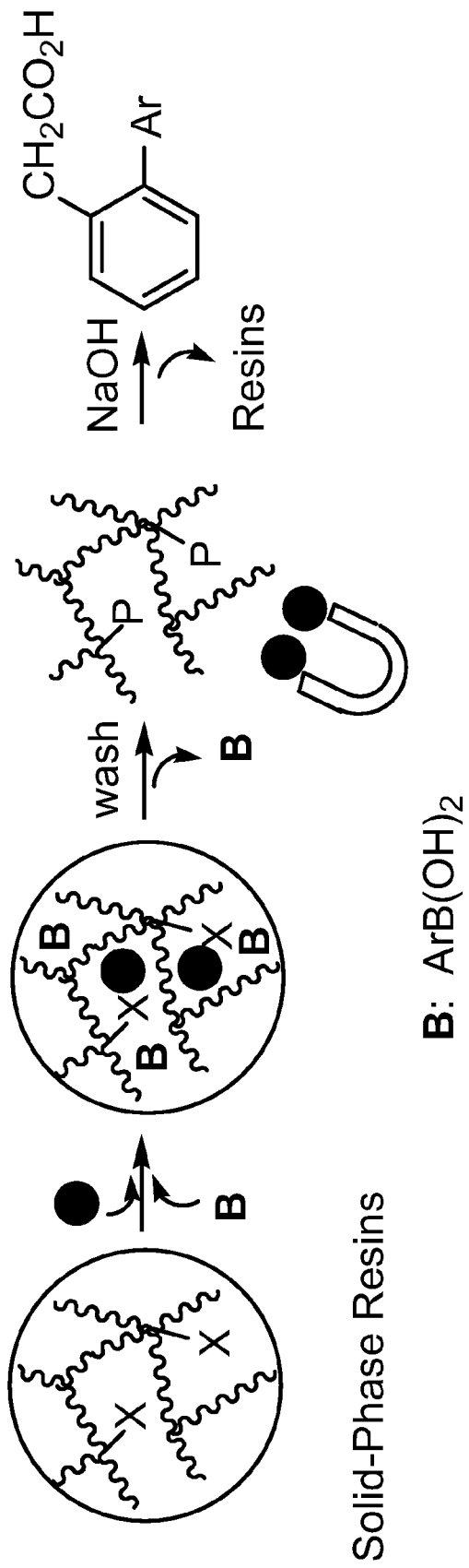
FIG. 4 diagrams a solid phase Suzuki coupling reaction catalyzed by a magnetic Pd nanocatalyst (diagramed in FIG. 1F). Substrate X was immobilized on the resin, which was contacted with the nanocatalyst and substrate B. The magnetic nanocatalyst was removed by applying an external magnet. The produce P was released from the resin and purified.
Figure 4:
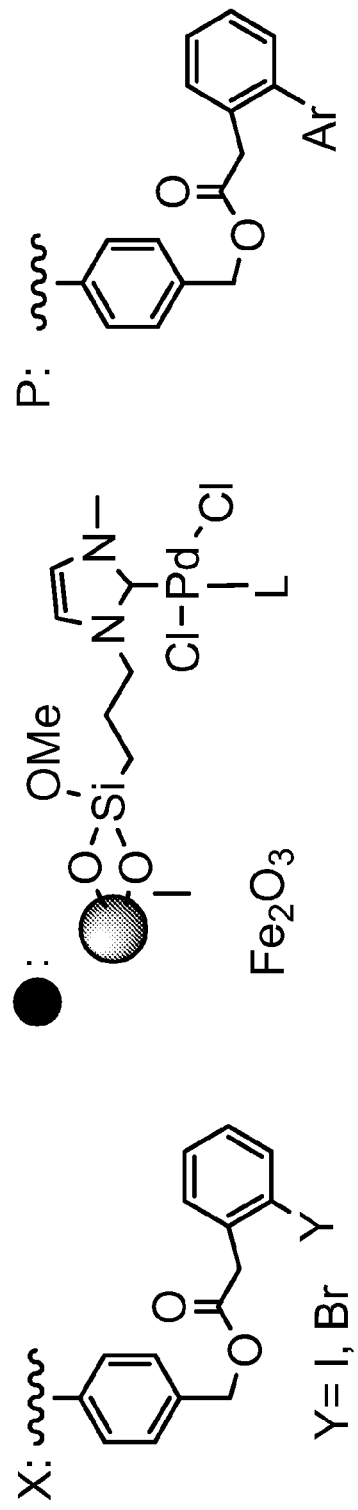

The reaction scheme is presented in FIG. 4. A typical solid-phase Suzuki cross-coupling reaction was as follows. First, a solid phase polystyrene resin (1% divinylbenzene crosslinked, 200-400 mesh) was loaded with aryl halogens (J. Org. Chem. 2006, 71, 537). Then, the aforementioned resin (1.22 g) loaded with an aryl halogen (1 mmol) was added to a mixed suspension of the arylboronic acid (2 mmol) and $K_2CO_3$ (2 mmol) in 20 mL of DMF containing Iron Oxide-Pd (4 nm) (30 mg, 0.87 mol %). The mixture was heated to 80° C. and was maintained at this temperature for 6 days. Iron Oxide-Pd was magnetically concentrated using an external permanent magnet. To this end, the mixture was vigorously shaken. A permanent magnet was then applied externally. Magnetic nanoparticles were concentrated on the sidewalls of the tube (horizontal direction) while some resins were suspended in solution or precipitate at the bottom of the tube (vertical). The suspended and precipitated resins, as well as the solution, were transferred out of the tube using a pipette. This process usually needed to be repeated more than eight times to ensure that most of nanoparticles were removed from resins. Iron Oxide-Pd was then washed with methanol (10× 200 mL). Afterwards, magnetic nanoparticles were further washed with water (5×100 mL) and methanol (5×100 mL). The nanoparticles were then air-dried and used directly for a new round of Suzuki reaction.

The resins and excessive arylborate were separated via filtration. The beads were recovered as the filter and subsequently washed with methanol (5×100 mL) and water (5×100 mL). The cleavage of the Suzuki product out of the resins was achieved by adding the solid-phase beads (1.18 g) and NaOH (2 mmol) to a mixture of ethanol (15 mL) and water (15 mL). The mixture was heated to reflux and stirred at this temperature for 2 days. After cooling down to ambient temperature, resins were filtered off and the filtrate was neutralized with 1 M HCl to pH 7. Solvents were removed in vacuo and the residues were extracted with ethyl acetate (10×50 mL). The combined organic solutions were dried over anhydrous $Na_2SO_4$ and subjected to HPLC and NMR analyses. A simple recrystallization step was also employed using EtOH/$H_2O$ to improve the purity of the Suzuki product. The structures of isolated Suzuki products were determined by $^1$H NMR, IR and high-resolution MS. HPLC analyses of isolated products after recrystallization showed that high purity (>99%) was obtained. A UV detector with a fixed wavelength of 254 nm was employed for signal detection. A typical HPLC analysis program used a solvent gradient starting from 40% $H_2O$ in $CH_3CN$ to 10% $H_2O$ in $CH_3CN$ in 6 min followed by 10% $H_2O$ in $CH_3CN$ for additional 9 min with a flow rate of 0.5 mL/min.

The yields of the solid-phase cross-coupling products were summarized in Table 3. The Iron Oxide-Pd nanocomplex effectively catalyzed these reactions.

TABLE 3

Suzuki Cross-Coupling of Aryl Halogens (on Resins) and Arylboronic Acids (in Solution) under Iron Oxide-Pd (4 nm).

| entry | Y[a] | borate | Suzuki product[b] | |
|---|---|---|---|---|
| | | | yield (%)[c] | purity (%)[d] |
| 1 | o-I | 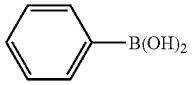 | 78 | >99 |

TABLE 3-continued

Suzuki Cross-Coupling of Aryl Halogens (on Resins) and
Arylboronic Acids (in Solution) under Iron Oxide-Pd (4 nm).

| entry | Y[a] | borate | Suzuki product[b] yield (%)[c] | purity (%)[d] |
|---|---|---|---|---|
| 2 | o-I | 2-MeO-C$_6$H$_4$-B(OH)$_2$ | 63 | >99 |
| 3 | o-I | 2-Me-C$_6$H$_4$-B(OH)$_2$ | 71 | >99 |
| 4 | o-I | 2-Ac-C$_6$H$_4$-B(OH)$_2$ | 77 | >99 |
| 5 | o-Br | C$_6$H$_5$-B(OH)$_2$ | 62 | >99 |

[a]See FIG. 4, Y = substitution on phenyl ring.
[b]Suzuki products were cleaved from resins and purified via recrystallization steps.
[c]Average of at least two runs.
[d]Purity was determined by HPLC analyses and the structures of Suzuki products were confirmed by $^1$H NMR and MS.

What is claimed is:

1. A nanocatalyst comprising at least one individual amino acid attached to a nanoparticle, wherein each individual amino acid is independently attached to the nanoparticle and has a reactive side chain that catalyzes a chemical reaction.

2. The nanocatalyst of claim 1, wherein the at least one individual amino acid is selected from the group consisting of aspartic acid, cysteine, glutamic acid, histidine, lysine, and serine.

3. The nanocatalyst of claim 1, wherein the at least one individual amino acid is attached to the nanoparticle directly.

4. The nanocatalyst of claim 1, wherein the at least one individual amino acid is attached to the nanoparticle by a linker.

5. The nanocatalyst of claim 1, wherein the nanoparticle is coated with a polymer, and the at least one individual amino acid is attached to the nanoparticle via the polymer.

6. The nanocatalyst of claim 4, wherein the nanoparticle is a metal oxide and the linker is selected from the group consisting of an alcohol, a diol, a carboxylic acid, and a hydroxide.

7. The nanocatalyst of claim 6, wherein the nanoparticle comprises iron oxide, the linker comprises silicon hydroxide, and at least two different amino acids are attached to the nanoparticle.

8. The nanocatalyst of claim 6, wherein the nanoparticle comprises iron oxide, the linker comprises dopamine, and at least two different amino acids are attached to the nanoparticle.

9. The nanocatalyst of claim 8, wherein the amino acids are aspartic acid and histidine in a one to one ratio.

* * * * *